F. E. CARTER.
TRUCK.
APPLICATION FILED JULY 17, 1920.

1,374,986.

Patented Apr. 19, 1921.
2 SHEETS—SHEET 1.

WITNESSES

INVENTOR
F. E. Carter,
BY
ATTORNEYS

F. E. CARTER.
TRUCK.
APPLICATION FILED JULY 17, 1920.

1,374,986.

Patented Apr. 19, 1921.
2 SHEETS—SHEET 2.

WITNESSES

J. H. Crawford.

INVENTOR
F. E. Carter,
BY
ATTORNEYS

UNITED STATES PATENT OFFICE.

FREDERICK ELI CARTER, OF YUMA, COLORADO.

TRUCK.

1,374,986.  Specification of Letters Patent.  Patented Apr. 19, 1921.

Application filed July 17, 1920. Serial No. 396,951.

*To all whom it may concern:*

Be it known that I, FREDERICK ELI CARTER, a citizen of the United States, and a resident of Yuma, in the county of Yuma and State of Colorado, have invented certain new and useful Improvements in Trucks, of which the following is a specification.

My invention relates in general to trucks, and more particularly to an improved truck especially adapted for handling the wheels of heavy motor vehicles.

The object of the invention is to provide an improved truck of this character which may be easily positioned to receive the wheel of a heavy motor vehicle, which may be adjusted to accommodate various size wheels, and which may be positively set or locked in engagement with the wheel to thereby positively support and carry the same.

Another object is to provide a device of this character of simple and durable construction, reliable and efficient in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1:
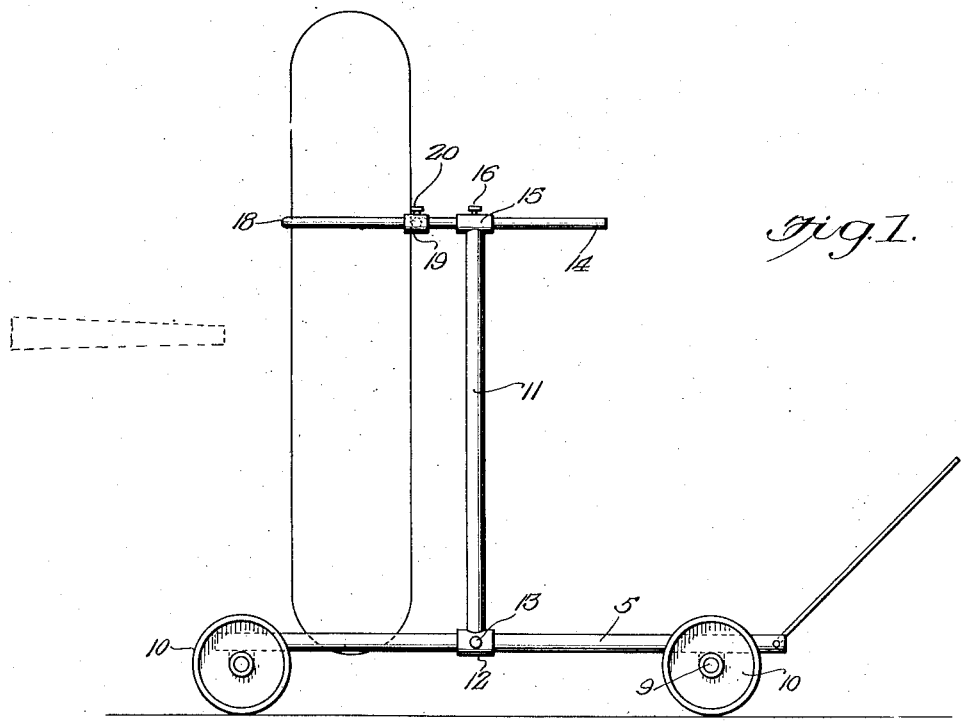
Figure 1 is a side elevational view of my invention carrying the wheel of a heavy motor truck.
Figure 2:
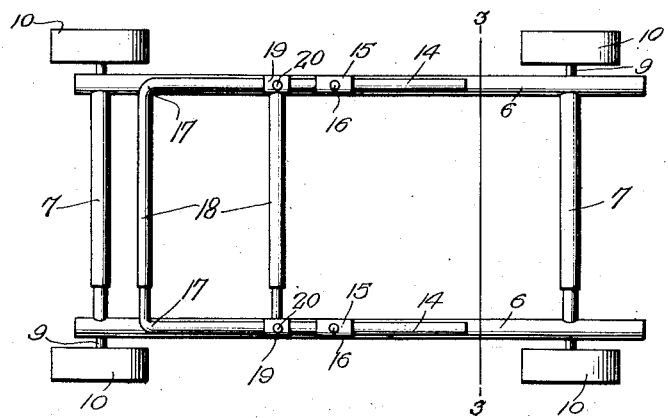
Fig. 2 is a plan view.
Figure 3:
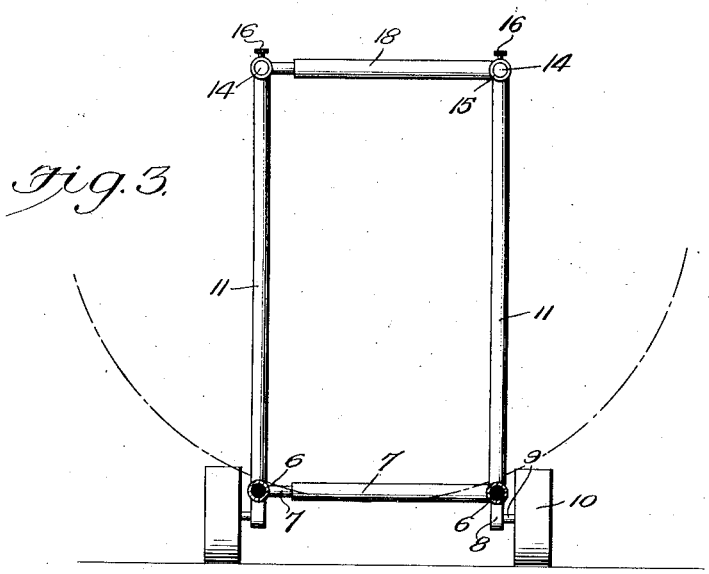
Fig. 3 is a sectional view on line 3—3 of Fig. 2.
Figure 4:
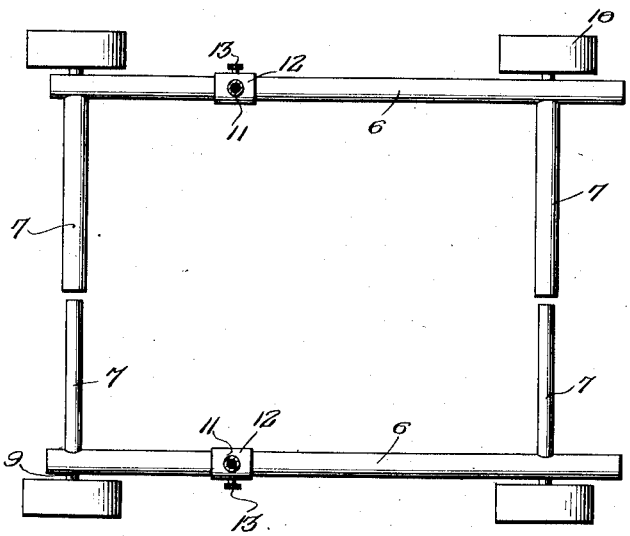
Fig. 4 is a transverse horizontal section.
Figure 5:
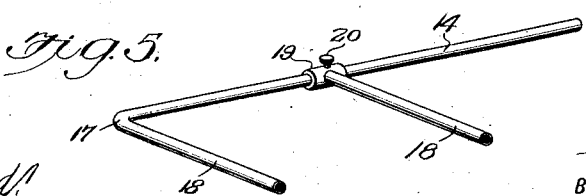
Fig. 5 is a fragmentary detail perspective view of the means for retaining the wheel on the truck.

Referring to the drawings, it will be seen that my invention contemplates a wheeled base, indicated generally at 5. This base comprises a pair of spaced and parallel longitudinal side members 6 which are preferably of hollow tubular construction. Adjacent their ends the side members 6 carry the telescopic end members 7 which are also of tubular construction, the telescopic sections of which lie one within the other whereby the lateral extent of the base may be varied. The end members 7 are also spaced and preferably parallel as shown in the drawings. Axle bearings 8 depend from the side members 6 adjacent each of the end members 7 and from these axle bearings stub axles 9 extend and carry at their outer ends small wheels or casters 10.

A pair of spaced standards 11 preferably also of tubular construction is provided and is carried by the base by means of a sleeve 12 connected to the lower extremity of each of the standards and slidably mounted on the respective side member 6.

A set screw 13 extends through the sleeve and engages the side member 6 to clamp the sleeve 12 in adjusted position.

Means is provided for retaining the wheel on the truck. This means consists of a pair of spaced longitudinal tubular bars 14. The bars 14 are each slidably mounted in a sleeve 15, each of which is fixed to the upper end of the respective standard 11. A set screw 16 extends through the sleeve 15 and engages the longitudinal bar 14 to clamp or lock the same in adjusted position. The outer end of each of the longitudinal bars is bent inwardly at right angles, as indicated at 17, and these inwardly bent portions constitute the outer member of a pair of spaced cross bars 18 embodied in the frame structure. The other member of the cross bars is adjustable, and for this purpose the telescopic tubular sections which comprise this member of the cross bars carry at their ends sleeves 19 which are slidably mounted upon the opposite longitudinal bars 14 and each carry set screws 20 engageable with the longitudinal bars 14, whereby the adjustable cross bar may be locked or set in adjusted position.

In the use of the device, it will be seen that it is only necessary to jack the vehicle up a comparatively short distance. The wheel base is then rolled beneath the wheel to be removed. The truck by virtue of the telescopic end members may be adjusted laterally as to the size and other working conditions which would make it desirable to vary the lateral extent of the base. With the longitudinal member 6 abutting the lower sides of the periphery of the wheel the standards are then slid along the side members to approximate position. The longitudinal bars 14 are then adjusted longitudinally in the sleeves 15 to approximate position and the members of the telescopic cross bars 18 are slid and rotated into telescopic engagement to embrace the upper portion of the wheel whereby they are rotated, their sleeves 12 partaking of relative rotary movement with respect to the side members 6 to accommodate the motion of the standards. The parts are then clamped in position by the set screws 13, 15 and 20 so as to lock the truck in engagement with and carry the wheel. The heavy wheel may then be removed endwise from the vehicle as shown in Fig. 1, and handled with facility and can be easily released or it can be repaired in position on the truck when desired.

The weight of the wheel by virtue of the force of friction which it sets up between the telescopic sections embodied in the truck renders the truck self locking.

In placing the wheel on the vehicle from the truck the truck is moved toward the axle until the axle enters and is properly arranged in the hub of the wheel. The set screws 16 and 13 are then loosened and the standards 11 are grasped and pulled laterally away from the truck. The members of the telescopic cross bars 18 then slide out of telescopic engagement and out of engagement with the wheel, the longitudinal bars 14 partaking of relative rotary motion with respect to the sleeves 15 of the standards 11 and the sleeves 12 of the standards 11 partaking of relative motion with respect to the side members 6 of the base to accommodate this action. After the cross bars 18 have been released from engagement with the wheel, the base may be readily removed from the support of the same.

I claim:

1. A truck of the character described comprising a wheeled base consisting of a pair of spaced tubular side members and a pair of telescopic tubular end members, a pair of spaced standards, means for rotatably and adjustably supporting said standards upon the respective side members of said base including a sleeve carried by the lower end of each of said standards and embracing the adjacent side member, and a set screw for each of said sleeves for securing said standards in adjusted position, means carried by the standards for retaining the wheel on the truck including a frame consisting of a pair of spaced longitudinal bars, a pair of spaced telescopic cross bars carried by said longitudinal bars, one of said cross bars being longitudinally adjustable on said longitudinal bar, sleeves carried by the upper ends of said standards and embracing the longitudinal bars of said frame, whereby said longitudinal bars are rotatably and adjustably carried by said standards, and a set screw for each of said last-mentioned sleeves whereby said longitudinal bars may be clamped in adjustable position.

2. A truck of the character described, comprising a wheeled base consisting of a pair of spaced tubular side members and a pair of telescopic tubular end members, a pair of spaced standards, means for rotatably and adjustably supporting said standards upon the respective side members of said base including a sleeve carried by the lower end of each of said standards and embracing the adjacent side member, means carried by the standards for retaining the wheel on the truck including a frame consisting of a pair of spaced longitudinal bars, a pair of spaced telescopic cross bars carried by said longitudinal bars, one of said cross bars being longitudinally adjustable on said longitudinal bar, and sleeves carried by the upper ends of said standards and embracing the longitudinal bars of said frame whereby said longitudinal bars are rotatably and adjustably carried by said standards.

3. A truck of the character described comprising a wheeled base consisting of a pair of spaced tubular side members and a pair of telescopic tubular end members, a pair of spaced standards, means for rotatably and adjustably supporting said standards upon the respective side members of said base, including a sleeve carried by the lower end of each of said standards and embracing the adjacent side members, and means carried by the standards for retaining the wheel on the truck including a frame consisting of a pair of spaced longitudinal bars rotatably and adjustably carried by said standards and a pair of spaced telescopic cross bars carried by said longitudinal bars, one of said cross bars being longitudinally adjustable.

4. A truck of the character described comprising a wheeled base including a pair of spaced tubular side members, a pair of spaced standards, means for rotatably and adjustably supporting said standards upon the respective side members of said base, including a sleeve carried by the lower end of each of said standards and embracing the adjacent side member, and means carried by the standards for retaining the wheel on the truck including a frame consisting of a pair of spaced longitudinal bars rotatably and adjustably carried by said standards, and a pair of spaced telescopic cross bars carried by said longitudinal bars.

5. A truck of the character described comprising a wheeled base, a pair of standards carried by said base, means for rotatably and adjustably supporting said standards upon said base, and means carried by the standards for retaining the wheel on said base including telescopic cross bars adapted to embrace the wheel and to be slid into and out of telescopic engagement upon lateral rotary movement of said standards.

FREDERICK ELI CARTER.